US006139947A

United States Patent [19]

Miyakusa et al.

[11] Patent Number: 6,139,947

[45] Date of Patent: Oct. 31, 2000

[54] METALLIC LUSTER THERMAL TRANSFER RECORDING MEDIUM

[75] Inventors: Yuuichi Miyakusa; Jun Sogabe, both of Osaka, Japan

[73] Assignee: Fujicopian Co., Ltd., Osaka, Japan

[21] Appl. No.: 09/338,849

[22] Filed: Jun. 23, 1999

[30] Foreign Application Priority Data

Jun. 24, 1998 [JP] Japan .................................. 10-177553

[51] Int. Cl.[7] .......................................................... B32B 5/16

[52] U.S. Cl. .......................... 428/323; 428/195; 428/913; 428/914

[58] Field of Search ..................................... 428/195, 204, 428/212, 323, 484, 488.1, 488.4, 913, 914

[56] References Cited

U.S. PATENT DOCUMENTS

| | | | |
|---|---|---|---|
| 5,130,180 | 7/1992 | Koshizuka | 428/212 |
| 5,279,884 | 1/1994 | Kitamura | 428/195 |
| 5,525,403 | 6/1996 | Kawabata | 428/212 |
| 5,879,790 | 3/1999 | Sogabe | 428/213 |

FOREIGN PATENT DOCUMENTS

| | | | |
|---|---|---|---|
| 0257499 | 3/1988 | European Pat. Off. | B41M 5/26 |
| 0263478 | 4/1988 | European Pat. Off. | B41M 5/26 |
| 0542208 | 5/1993 | European Pat. Off. | B41M 5/38 |
| 0568031 A1 | 11/1993 | European Pat. Off. | B41M 5/00 |
| 03178488 | 2/1991 | Japan | B41M 5/40 |
| 03051184 | 5/1991 | Japan | B41M 5/40 |
| 4-144790 | 5/1992 | Japan | B41M 5/26 |
| 04292991 | 10/1992 | Japan | B41M 5/40 |

*Primary Examiner*—Bruce H. Hess
*Assistant Examiner*—Michael E. Grendzynski
*Attorney, Agent, or Firm*—Fish & Neave

[57] ABSTRACT

A thermal transfer recording medium for forming printed images with high metallic luster is disclosed which comprises a foundation, and provided on one side of the foundation in order from the foundation side, at least a release layer, an anchor layer for metal deposition, a metal deposition layer and an adhesive layer, the anchor layer containing 0.1 to 3% by weight of particles having an average particle size more than the thickness of the anchor layer.

2 Claims, No Drawings

METALLIC LUSTER THERMAL TRANSFER RECORDING MEDIUM

BACKGROUND OF THE INVENTION

The present invention relates to a thermal transfer recording medium for use in thermal transfer recording devices such as thermal transfer recording printers or facsimile terminal equipment and particularly to a thermal transfer recording medium for forming printed images (such as letters and pictures) with metallic luster.

Heretofore there are known thermal transfer recording media of this type for forming printed images with metallic luster. For example, Japanese Patent Unexamined Publication No. 63-30288 discloses a thermal transfer recording medium of the structure comprising a foundation having on one side thereof a release layer, an anchor layer for metal deposition, a metal deposition layer and an adhesive layer in this order.

In the aforesaid prior art, a resin having a high molecular weight and a high glass transition point was generally used for the resin component of the anchor layer on which a metal is to be deposited in order to obtain a metal deposition layer with high metallic luster. The use of such a resin component gives a metal deposition layer with high metallic luster but causes the problem wherein the sharpness of printed images or transferability is degraded.

On the other hand, the use of a resin having a low glass transition point provides good transferability but cannot give a metal deposition layer with high metallic luster. Further, the luster of the metal deposition layer is markedly reduced due to the transfer thereof, resulting in failure to give a printed image with high metallic luster.

In view of the foregoing, it is an object of the present invention to provide a thermal transfer recording medium which has superior transferability and is capable of forming a printed image with high metallic luster.

This and other objects of the present invention will become apparent from the description hereinafter.

SUMMARY OF THE INVENTION

The present invention provides a metallic luster thermal transfer recording medium comprising a foundation, and provided on one side of the foundation in order from the foundation side, at least a release layer, an anchor layer for metal deposition, a metal deposition layer and an adhesive layer, the anchor layer containing 0.1 to 3% by weight of particles having an average particle size more than the thickness of the anchor layer.

According to an embodiment of the present invention, the anchor layer comprises a resin component, the resin component comprising as a main component a resin having a glass transition point of 50° to 120° C.

DETAILED DESCRIPTION

In the present invention, the anchor layer for metal deposition contains 0.1 to 3% by weight of particles having an average particle size more than the thickness of the anchor layer, by which a metal deposition layer with high metallic luster is obtained and the high metallic luster is not degraded upon transferring. Thus, printed images with high metallic luster can be obtained. It is presumed that the reason why the metallic luster of the metal deposition layer is not degraded upon transferring because when a heated portion of the transfer layer containing the metal deposition layer is softened or melted and transferred, the layer structure of the transfer layer at the heated portion is prevented from collapsing due to the presence of the specific particles and defects such as cracks do not occur in the metal deposition layer.

When the average particle size of the particles contained in the anchor layer is smaller than the thickness of the anchor layer, the metallic luster of the metal deposition layer is degraded upon transferring. When the particles are excessively large, a metal deposition layer with high metallic luster is not obtained. Therefore, the average particle size of the particles is preferably not more than ten times the thickness of the anchor layer. As a result, the preferred average particle size of the particles is not less than 1.5 time the thickness of the anchor layer and not more than 5 times the thickness of the anchor layer. When the content of the particles in the anchor layer is less than 0.1% by weight, the metallic luster of the metal deposition layer is degraded upon transferring. When the content of the particles in the anchor layer is more than 3.0% by weight, the unevenness of the surface of the anchor layer becomes marked, resulting in failure to obtain a metal deposition layer with high metallic luster.

The present invention will be explained in detail.

The thermal transfer recording medium of the present invention has a basic structure comprising a foundation and, provided on one side of the foundation in order from the foundation side, a release layer, an anchor layer for metal deposition, a metal deposition layer and an adhesive layer. A colored ink layer may be provided between the release layer and the anchor layer, as required.

As the foundation, any films or sheets generally used as the foundation for thermal transfer recording media can be used, inclusive of plastic films such as polyester films, polyamide films and polycarbonate films, and the like. The foundation preferably has a thickness of about 1 to about 10 μm. As required, a heat-resistant protective layer may be provided on the backside (the side to be contacted by a thermal head) of the foundation in order to prevent the foundation from sticking to the thermal head.

The release layer functions as follows: When being transferred, the release layer is melted by means of heat signals from the thermal head or the like to facilitate the release of heated portions of a transfer layer from the foundation, wherein the transfer layer comprises the stacked anchor layer/metal deposition layer/adhesive layer, or the stacked colored ink layer/anchor layer/metal deposition layer/adhesive layer. The release layer is composed of a wax as a main component. As required, the release layer may be incorporated with a thermoplastic resin (inclusive of elastomer) to adjust the adhesion between the release layer and the foundation or the anchor layer.

Examples of the aforesaid wax include natural waxes such as carnauba wax, candelilla wax and montan wax; petroleum waxes such as paraffin wax and microcrystalline wax; synthetic waxes such as oxidized wax, ester wax, polyethylene wax and α-olefin-maleic anhydride copolymer wax. These waxes may be used either alone or in combination.

Examples of the aforesaid thermoplastic resin include polyester resins, polyamide resins, polyurethane resins, ethylene-vinyl acetate copolymers, vinyl chloride-vinyl acetate copolymers, polyvinyl butyral, α-olefin-maleic anhydride copolymer resins, acrylic resins, styrene resins, petroleum resins, rosin resins, terpene resins, polypropylene resins and ionomer resins. These resins may be used either alone or in combination.

The release layer can be formed by applying onto the foundation a coating liquid, which is prepared by dissolving or dispersing the wax and optionally the thermoplastic resin into a suitable solvent (inclusive of water), followed by drying. Alternatively, the release layer can be formed by a hot-melt coating method. The coating amount (on a dry weight basis, hereinafter the same) of the release layer is usually from about 0.1 to about 1 $g/m^2$.

The anchor layer serves as a surface on which a metal is to be deposited in deposition step for forming a metal deposition layer and a layer for supporting the formed metal deposition layer. The anchor layer is composed of a resin component and the aforesaid specific particles as main components and optionally a coloring agent. As described above, the content of the specific particles in the anchor layer is from 0.1 to 3% by weight. The content of the resin component in the anchor layer is preferably not less than 50% by weight, especially not less than 70% by weight.

The resin component preferably comprises one or more resins having a glass transition point of 50° to 120° C. as a main component. When the glass transition point of the resin as a main component is less than 50° C., the anchor layer serving as the surface on which a metal is to be deposited in deposition step is poor in heat resistance, resulting in failure to obtain a metal deposition layer with high metallic luster. When the glass transition point of the resin as a main component is more than 120° C., the transferability is prone to be degraded, although a metal deposition layer with high metallic luster is obtained. The content of the resin having a glass transition point of 50° to 120° C. in the resin component is preferably not less than 80% by weight.

Examples of resins for the resin component include acrylic resins, polyester resins, polyamide resins, cellulosic resins such as nitrocellulose, polyurethane resins, epoxy resins. These resins may be used either alone or in combination. Acrylic resins are especially preferred.

The particles to be added to the anchor layer are preferably those which do not so reduce the transparency of the anchor layer. Examples of the particles are inorganic particles such as silica, calcium carbonate, barium sulfate, alumina, magnesium carbonate, tin oxide and titanium oxide, and organic particles such as melamine resin particles. These particles may be used either alone or in combination.

When a metallic luster in a variety of colors which are not limited to the metallic luster inherent to the metal deposition layer is required, the anchor layer may be incorporated with a coloring agent. As the coloring agent, a dye is preferably used to ensure the transparency of the anchor layer.

The anchor layer can be formed by applying onto the release layer a coating liquid, which is prepared by mixing the particles and optionally a coloring agent with a solution or dispersion (inclusive of emulsion) of the aforesaid resin in a suitable solvent (inclusive of water), followed by drying.

The thickness of the anchor layer is not particularly limited so long as the desired function of the anchor layer is exhibited. Generally, however, the thickness is preferably 0.2 to 1 μm. The thickness of the anchor layer refers to an average value of the thickness values measured at portions where no aforesaid specific particles exist. When the thickness of the anchor layer is less than the above range, the desired function of the anchor layer is not satisfactorily exhibited. When the thickness of the anchor layer is more than the above range, the transferability is prone to be degraded.

Examples of metals for the metal deposition layer are aluminum, zinc, tin, nickel, chromium, titanium, copper, silver, gold, platinum, and the like metal, and mixtures or alloys thereof. Usually aluminum is preferred. The metal deposition layer can be formed by a physical deposition technique such as vacuum deposition, sputtering or iron plating, or chemical deposition technique.

To ensure high metallic luster, the thickness of the metal deposition layer is preferably in the range of 10 to 100 nm, especially 20 to 80 nm.

The adhesive layer is composed of an adhesive resin as a main component. Examples of the adhesive resin are polyester resins, polyamide resins, polyurethane resins, ethylene-vinyl acetate copolymers, ethylene-(meth)acrylic acid ester copolymers, petroleum resins, rosin resins and terpene resins. These adhesive resins may be used either alone or in combination.

The adhesive layer can be formed by applying onto the metal deposition layer a coating liquid, which is prepared by dissolving or dispersing the aforesaid adhesive resin into a suitable solvent (inclusive of water) and optionally dispersing particles thereinto, followed by drying. The coating amount of the adhesive layer is preferably in the range of about 0.2 to about 1 $g/m^2$.

The present invention will be described in more detail by way of Examples and Comparative Examples. It is to be understood that the present invention will not be limited to these Examples, and various changes and modifications may be made in the invention without departing from the spirit and scope thereof.

EXAMPLES 1–2 AND COMPARATIVE EXAMPLES 1–4

A 4.5 μm-thick polyethylene terephthalate film having a heat-resistant protective layer composed of a silicone resin on one side thereof was used as a foundation. Onto the other side of the foundation the protective layer was applied and dried a coating liquid for release layer of the following formula to give a release layer with a coating amount of 0.2 $g/m^2$.

| Coating liquid for release layer | |
|---|---|
| Component | Parts by weight |
| Paraffin wax | 5 |
| Carnauba wax | 3 |
| Diacarna 30K (α-olefin-maleic anhydride copolymer wax made by Mitsubishi Chemical Corporation) | 2 |
| Toluene | 90 |

Onto the release layer was applied and dried a coating liquid for anchor layer of the formula shown in Table 1 to give an anchor layer having a thickness of 0.5 μm. The coating liquid for anchor layer was prepared by mixing the composition by means of a mixer (Despa made by Asada Tekko Kabushiki Kaisha) for one hour. Onto the anchor layer was formed an aluminum deposition layer having a thickness of 50 nm by a vacuum deposition method.

TABLE 1

| Component (% by weight) | Ex. 1 | Ex. 2 | Com. Ex. 1 | Com. Ex. 2 | Com. Ex. 3 | Com. Ex. 4 |
|---|---|---|---|---|---|---|
| Dianal BR80*[1] | 8.10 | 7.94 | 8.18 | 8.10 | 8.17 | 7.78 |
| Valifast Yellow 4120*[2] | 1.82 | 1.82 | 1.82 | 1.82 | 1.82 | 1.82 |
| Nipsil NA*[3] | 0.08 | 0.24 | — | — | 0.005 | 0.40 |
| Hakuenka*[4] | — | — | — | 0.08 | — | — |
| Methyl ethyl ketone | 85 | 85 | 85 | 85 | 85 | 85 |
| Methyl isobutyl ketone | 5 | 5 | 5 | 5 | 5 | 5 |

*[1]: Methyl methacrylate resin (glass transition point: 105° C., weight average molecular weight: $10 \times 10^4$)
*[2]: Dye made by Orient Kagaku Kogyo Kabushiki Kaisha
*[3]: Silica (average particle size: 1.0 μm) made by Nippon Silica Kogyo Kabushiki Kaisha
*[4]: Calcium carbonate (average particle size: 0.04 μm) made by Shiraishi Calcium Kabushiki Kaisha Onto the aluminum deposition layer was applied and dried a coating liquid for adhesive layer of the following formula to give an adhesive layer with a coating amount of 0.5 g/m$^2$.

| Coating liquid for adhesive layer | |
|---|---|
| Component | Parts by weight |
| Versamid JP550 (polyamide resin made by Henkel Corporation) | 10 |
| Isopropyl alcohol | 72 |
| Toluene | 18 |

Using each of the thus obtained thermal transfer recording media, solid-printing was performed on a receptor paper (white greeting card made by Mitsubishi Paper Mills Ltd.) by means of a thermal transfer printer (MD1300 made by Alps Electric Co., Ltd.). The gloss (60 degree gloss) of the thus obtained solid-printed portions was measured by means of a glossmeter (digital glossmeter GM-260 made by Kabushiki Kaisha Murakami Shikisai Gijutsu Kenkyusho). The results are shown in Table 2.

TABLE 2

| | Particles contained in anchor layer | | |
|---|---|---|---|
| | Average particle size (μm) | Content (% by weight) | Gloss |
| Ex. 1 | 1 | 0.8 | 744 |
| Ex. 2 | 1 | 2.4 | 682 |
| Com. Ex. 1 | — | — | 246 |
| Com. Ex. 2 | 0.04 | 0.8 | 350 |
| Com. Ex. 3 | 1 | 0.05 | 184 |
| Com. Ex. 4 | 1 | 4 | 300 |

As is apparent from Table 2, the thermal transfer recording media each having an anchor layer which contains particles having an average particle size more than the thickness of the anchor layer in a content within the range of 0.1 to 3% by weight (Examples 1 and 2) give metallic luster images with high gloss, as compared with the thermal transfer recording media each having an anchor layer wherein the average particle size or the content is outside the above ranges (Comparative Examples 1 to 4).

The thermal transfer recording medium of the present invention wherein the anchor layer contains 0.1 to 3% by weight of particles having an average particle size more than the thickness of the anchor layer has superior transferability and is capable of forming a printed image with high metallic luster.

What we claim is:

1. A thermal transfer recording medium for forming a printed image with metallic luster, comprising a foundation, and provided on one side of the foundation in order from the foundation side, a release layer, an anchor layer for metal deposition, a metal deposition layer and an adhesive layer, the anchor layer containing 0.1 to 3% by weight of particles having an average particle size more than the thickness of the anchor layer.

2. The metallic luster thermal transfer recording medium of claim 1, wherein the anchor layer comprises a resin component, the resin component comprising as a main component a resin having a glass transition point of 50° to 120° C.

* * * * *